United States Patent

Darr et al.

Patent Number: 5,927,525
Date of Patent: Jul. 27, 1999

[54] MULTI-LAYER CONTAINERS AND PREFORMS

[75] Inventors: Richard C. Darr, Medina; Michael C Kitzmiller, Ft. Loramie, both of Ohio

[73] Assignee: Plastipak Packaging, Inc., Plymouth, Mich.

[21] Appl. No.: 08/847,868

[22] Filed: Apr. 28, 1997

[51] Int. Cl.⁶ .............. B65D 1/02; B65D 23/02; B65D 23/08; B32B 1/02
[52] U.S. Cl. ............ 215/12.2; 215/12.1; 215/375; 428/35.7; 428/542.8
[58] Field of Search ............... 215/12.1, 12.2, 215/375, 379; 428/35.7, 542.8

[56] References Cited

U.S. PATENT DOCUMENTS

| | | | |
|---|---|---|---|
| 3,310,834 | 3/1967 | Simpson et al. | |
| 3,764,250 | 10/1973 | Waterloo | 425/326 |
| 3,869,056 | 3/1975 | Valyi | |
| 3,986,807 | 10/1976 | Takegami et al. | 425/307 |
| 4,427,122 | 1/1984 | Jakobsen | 215/12.2 X |
| 4,646,925 | 3/1987 | Nohara | |
| 4,662,528 | 5/1987 | Slat | 215/12.2 |
| 4,728,549 | 3/1988 | Shimizu et al. | 215/12.2 X |
| 4,741,936 | 5/1988 | Nohara et al. | |
| 4,764,403 | 8/1988 | Ajmera | 215/12.2 X |
| 4,797,244 | 1/1989 | Sauer | 215/12.2 X |
| 4,868,026 | 9/1989 | Shimizu et al. | 215/12.2 X |
| 4,907,957 | 3/1990 | Nakagawa et al. | 215/12.2 X |
| 4,923,723 | 5/1990 | Collette et al. | 215/12.2 X |
| 4,936,473 | 6/1990 | Nahill et al. | 215/12.2 |
| 5,240,718 | 8/1993 | Young et al. | 425/539 |
| 5,244,610 | 9/1993 | Kitzmiller | 425/139 X |
| 5,464,106 | 11/1995 | Slat et al. | 215/12.1 |
| 5,599,598 | 2/1997 | Valyi | 215/12.2 X |
| 5,645,183 | 7/1997 | Slat et al. | 215/12.2 |
| 5,688,572 | 11/1997 | Slat et al. | 215/12.2 X |

*Primary Examiner*—Sue A. Weaver
*Attorney, Agent, or Firm*—Bachman & LaPointe, P.C.

[57] ABSTRACT

A multi-layer preform for forming multi-layer containers includes an extruded inner barrier layer, said inner layer having an upper portion adapted to be formed into an upper portion of a container, an intermediate portion adapted to be formed into an intermediate portion of a container, an extruded and a base portion adapted to form a base portion of a container. The preform includes an outer injection molded layer.

20 Claims, 5 Drawing Sheets

MULTI-LAYER CONTAINERS AND PREFORMS

BACKGROUND OF THE INVENTION

This invention is directed toward containers and container preforms, and more particularly to multi-layer containers and multi-layer container preforms.

Multi-layer containers are typically manufactured for allowing the use of different materials in each of the layers, wherein each material has a specific property adapted to perform the specific function of the layer. The multi-layer containers are manufactured in a variety of ways as represented in the following devices and methods.

For example, U.S. Pat. No. 4,741,936 discloses a laminated preform for a multi-layer polyester bottle. In forming the preform, the process includes forming by co-extrusion a pipe having inner and outer layers of polyester composed mainly of ethylene terephthalate units and an intermediate layer of an oxygen-barrier resin interposed between the inner and outer layers. An adhesive resin is also preferably interposed between adjacent layers. The thickness of the layers of the multi-layer pipe are sized to be uniform. The process for forming the preform includes cooling the outer portion of the molten multi-layer pipe by contact with water and simultaneously introducing an inert gas into the interior of the pipe to cool the inner portion. The pipe is later draw-formed into a multi-layer drawn bottle. The multi-layer bottle disclosed in U.S. Pat. No. 4,741,936, while including a plurality of layers having different properties for different functions, discloses no process or device for causing thickness variations at selected portions of the bottle and on selected layers. Accordingly, the thicknesses at each portion of the bottle are limited by the feasibility of the same thickness at other portions, thereby decreasing the usefulness of the container.

U.S. Pat. No. 4,646,925 discloses a multi-layer preform for draw forming a bottle which is formed by injection molding. The preform includes a neck portion having an open end and a part for engagement with a lid member. It further includes a thick barrel portion to be drawn and a closed bottom portion, wherein the neck portion and the inner wall of the bottom and barrel portions are integrally formed of a thermoplastic polyester. A thin intermediate layer composed of a gas-barrier thermoplastic resin is formed on the inner walls of the barrel and bottom portions so that the top end of the intermediate layer is extended to a point just below the neck portion. An outer layer of thermoplastic polyester is formed in such a positional relation so that the outer layer covers the intermediate layer. A joint is formed directly on the intermediate layer between the outer layer and the neck portion just below the neck portion. Being that the preform is formed by injection molding, thickness variation is directly dependent upon the shape of the mold. Therefore, a particular thickness design cannot be formed unless a new mold is also formed thereby decreasing the freedom for thickness variation for facilitating different functions.

Because the different portions of containers perform different functions, it is often desirable to vary the thickness of the container walls at the specific portion depending upon its function. For example, where a portion of a container is used for supporting the entire container, a thicker wall thickness might be preferred for additional strength. However, such additional thickness may not be desirable in other portions of the container, such as the sidewalls, due to such factors as desired flexibility, transparency and efficiency in material use. Therefore, for single-layer and multi-layer containers, it is often desirable to vary the thickness of the various layers at different portions of the container.

U.S. Pat. No. 3,869,056 discloses a multi-layered hollow plastic container. The container disclosed has an inner thermoplastic layer and an outer pressure molded layer. The container also has an integral open neck or rim portion wherein the thickness of the layers at the neck and rim portion are greater than the thickness of the layers in the remainder of the container. At the upper end of the container, the inner layer of the container overlaps the outer layer of the container at the neck or rim portion. While this patent discloses a container having variable thickness at the neck portion in comparison to the remaining portions of the container, such variable thickness is not applicable to other portions.

In addition, the barrier layer is generally an expensive material so that it is desirable to utilize a relatively thin layer for the barrier while at the same time assuring its viability as a barrier.

There exists a need, therefore, in the container manufacturing art, for a preform and container having multiple layers of material wherein the layers serve the functions of the container and a process for accomplishing the same. There also exists a need to provide such a preform and container with desirable properties, as heat resistance, oxidation resistance and $CO_2$ resistance, at a reasonable cost and in a simple and convenient manner.

SUMMARY OF THE INVENTION

The primary object of the present invention is to provide a preform and container formed from multiple layers, one of which being a barrier layer, and wherein the layers effectively serve their functions.

Another object of this invention is to provide a preform for forming a container which is highly convenient for recycling and which has desirable properties, as heat resistance, oxidation resistance, and $CO_2$ resistance, at a reasonable cost and in a simple and convenient manner.

Yet another object of this invention is to provide a preform and container having multiple layers wherein the inner layer is of minimal thickness for material saving purposes and wherein the cost of the barrier layer is minimized while preserving its effectiveness.

Still another object of this invention is to provide a multi-layer preform and container wherein each layer has a specific function such as a barrier layer, a contents contact layer, and an outer layer, and wherein the container and preform can be efficiently and conveniently produced.

The foregoing objects are attained by the inventive, heat resistant multi-layer preform for forming multi-layer containers of the present invention, wherein the preforms include an extruded inner layer forming a cavity and defining an upper portion which is adapted to form an upper portion of a container and including an access opening therein. The inner layer also includes an extruded intermediate portion adjacent the upper portion which is adapted to form an intermediate portion of the container. The inner layer also includes an extruded and closed base portion adjacent the intermediate portion which is adapted to form a base portion of the container. The preform also includes an injection molded outer layer located substantially adjacent the inner layer and coextensive therewith, wherein the outer layer comprises the major portion of the thickness of the container. The inner layer comprises at least two layers, with the innermost first layer extending over the entire upper portion, the intermediate portion and the base portion, and the intermediate second layer comprising a barrier layer extending from above the closed base to below the access opening, as for example extending substantially only over the intermediate portion. In a preferred embodiment, the inner layer is a multi-layered laminate including the second layer as the central layer, the first layer as the innermost layer and a third layer as an outer layer wherein the first, central and outer layers are co-extruded.

The multi-layer container formed by the preform described above includes an extruded inner layer forming a cavity and defining an upper portion including an access opening therein, an intermediate portion and a closed base portion; and an outer injection molded layer located substantially adjacent the inner layer and substantially coextensive therewith; wherein the outer layer comprises the major portion of the thickness of the container; and wherein the inner and outer layers are blow molded. The container also desirably includes a footed base wall portion formed from at least the inner layer and the outer layer of material, although the present invention is not restricted to a footed base and the container may have other base configurations, as for example, a rounded base. The inner layer of the container comprises at least two layers, with the innermost first layer extending over the entire upper portion, intermediate portion and base portion, and the intermediate second portion comprising a barrier layer, as an ethylene vinyl alcohol copolymer, extending from above the closed base portion to below the access opening.

The container formed from the preform of the present invention has highly advantageous properties. Thus, the container is characterized by excellent heat resistance, oxygen resistance and $CO_2$ resistance. The combination of an extruded inner layer and injection molded outer layer enables one to adjust the thickness of various portions of the container as desired. The use of less barrier material has been found to save a considerable cost while maintaining excellent barrier properties. Moreover, one can readily obtain an oriented container with control over the amount of orientation due to the extrusion procedure. Also, one can obtain a lighter container with improved properties over comparable heavier containers. One can also use one shape preform for a variety of different shaped containers and with different orientation. Further, the container can be prepared using conventional equipment.

The details of the present invention are set out in the following description and drawings wherein like reference characters depict like elements.

DETAILED DESCRIPTION OF THE PREFERRED EMBODIMENT

Figure 1:
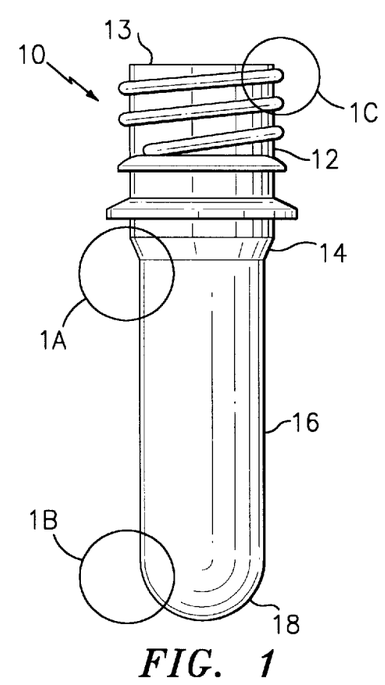
FIG. 1 is an elevational view of a preform in accordance with the principles of the present invention.
Figures 9, 9A, 9B:
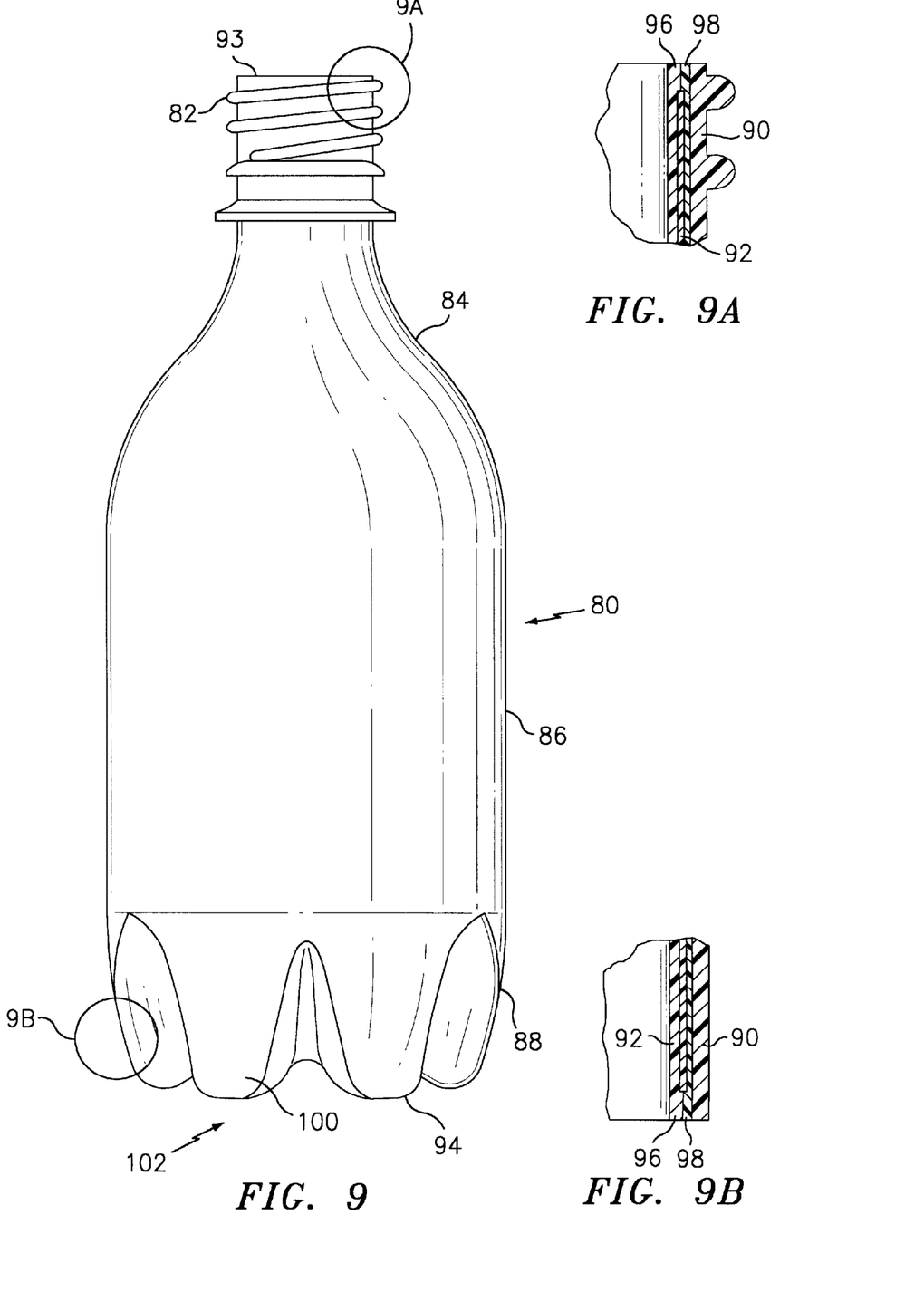
FIG. 9 is an elevational view of a container in accordance with the principles of the present invention.
FIGS. 9A, and 9B are cross-sectional and enlarged views of various areas of the container.

Referring now to the drawings in detail, wherein like reference numerals and letters designate like elements, there is shown in FIG. 1 an elevational view of a preform, in accordance with the principles of the present invention, designated generally as 10. Preform 10 typically includes a threaded and flanged upper portion 12 with an access opening 13 therein, an angled intermediate portion 14, a vertical intermediate portion 16 and a closed base portion 18. In the configuration as shown in FIG. 1, preform 10 is adapted to be blow molded into a container, a preferred embodiment of which is shown in FIG. 9, in accordance with the principles of the present invention.

Figure 1A:
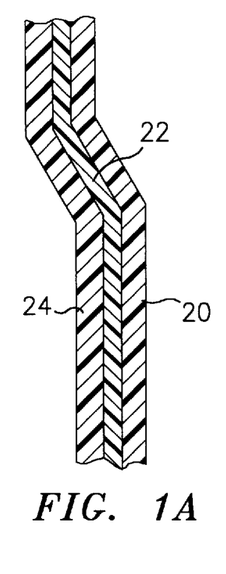
FIGS. 1A, 1B and 1C are enlarged cross-sectional views of various areas of the preform of FIG. 1, showing relative changes in layer thickness between different areas of the preform.
Figure 8:
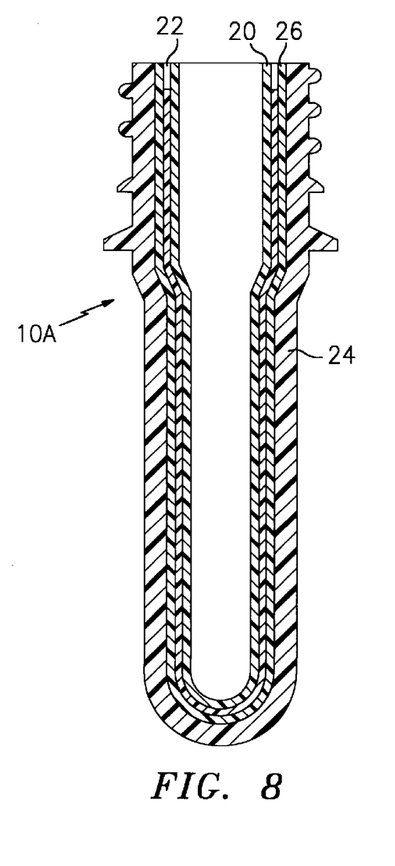
FIG. 8 is a cross-sectional view of a three-layered preform liner and an injection molded outer layer prepared as shown in FIG. 5.

Referring now to FIG. 1A, preform 10 is preferably formed from three or four layers of material, with the inner layer desirably being a multi-layered laminate and including an encircling innermost layer 20, an encircling central barrier layer 22, and the preform including an encircling, injection molded outer layer 24. If desired and in a preferred embodiment, a modified preform 10A may be used as shown in FIG. 8, wherein the barrier or second layer 22 may be sandwiched between first innermost layer 20 and a third layer 26, with an injection molded outer layer 24 being the outermost layer. Naturally, more than the four layers shown in FIG. 8 can be used, if desired. As can be seen from FIGS. 1A–1C, the thicknesses of the inner layer may vary in accordance with specific portions of preform 10 or 10A. In the three-layer embodiment shown in FIG. 1, the barrier layer 22 and outer layer 24 maintain a constant thickness substantially over the entire body of preform 10. Outer layer 24 varies in thickness at threaded and flanged upper portion 12. Innermost layer 20 may vary in thickness depending upon the portion of the bottle, i.e., threaded and flanged upper portion 12, angled and vertical intermediate portions 14 and 16, and base portion 18.

Innermost layer 20 and barrier layer 22 together with third layer 26, if used, are coextruded via an extrusion process discussed below, and outer layer 24 is formed onto the extruded layers via an injection molding process, which allows the formation of the threaded upper portion 12. As a result of the extrusion process, innermost layer 20 can be controllably adjusted in thickness based upon the functions to be performed by the various portions comprising preform 10 or 10A and the container. Also, as will be discussed below, the barrier layer is desirably foreshortened to extend from above the closed base 18 to below access opening 13 as shown in FIG. 1.

Variations in thickness of the inner layer are desirable for several reasons which include aesthetics, efficient material use and reduced costs, and variable strength requirements. Efficient material use is evident in innermost layer 20 at upper portion 12, where innermost layer 20 is thinnest. Strength considerations are evident in base portion 18, where additional support is required and as a result, innermost layer 20 is thickest.

In addition, it is highly desirable to utilize the barrier material over less than the entire length of the preform in order to save cost on this expensive component. Also, such use of less barrier material reduces the amount of the expensive barrier used in scrap. Some trimming is normally required in preparing the preforms. If the barrier material is not for example used above the access opening where the scrap is trimmed, less of this expensive material would find its way into scrap. Further, some barrier materials, as the desirable ethylene vinyl alcohol copolymers (EVOH), bond poorly to for example polyethylene terephthalate (PET). Therefore, the absence of EVOH from the upper portion of the preform as shown in FIG. 1C and from the base as shown in FIG. 1B permits an innermost PET layer 22 to bond to a layer with good bonding properties, as another PET layer 24 or 26.

Figure 1B:
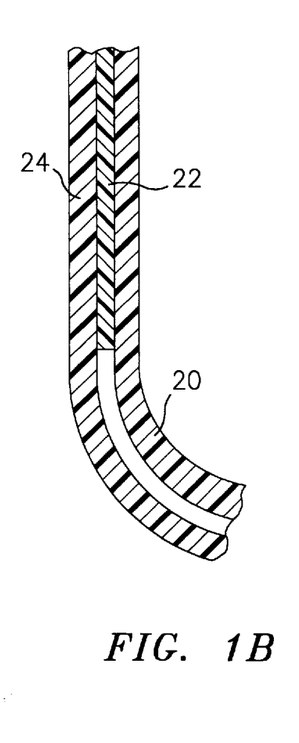
Figure 1C:
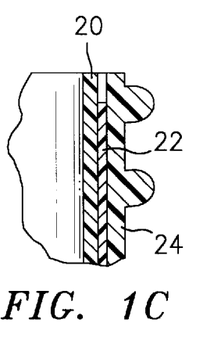

Referring now in detail to FIGS. 1A–1C, which represent enlarged detailed views of areas 1A, 1B and 1C, respectively, of FIG. 1, innermost layer 20 is preferably formed from polyethylene terephthalate (PET). Central barrier layer 22 is a barrier such as polyethylene naphthalate (PEN) or a blend containing PEN, or saran, or desirably ethylene vinyl alcohol copolymers (EVOH) or acrylonitrile copolymers, such as Barex 210. If a blend with PEN is used, one should preferably use at least 25% PEN in the blend. The term saran is used in its normal commercial sense to contemplate polymers made for example by polymerizing vinylidene chloride and vinyl chloride or methyl acrylate. Additional monomers may be included as is well known. Vinylidene chloride polymers are the most commonly used, but other oxygen barrier materials are well known.

The thickness of innermost layer 20 is desirably varied depending on areas. Thus, the intermediate portions of layer 20 are desirably of medium thickness in comparison to the thicker upper and base portions of layer 20. At the intermediate portions 14 and 16, the medium thickness layer is used because this portion of the preform wall is to be used for containment purposes, but not for support. Larger thickness of layer 20 is preferable for base portion 18 in that base portion 18 is used to support the container (shown in FIG. 9) formed by preform 10 or 10A. Base portion 18 is desirably formed into a footed support (shown in FIG. 9), and therefore is necessarily thicker for withstanding the weight of the container and its contents. At threaded upper portion 12, innermost layer 20 desirably has a thickness which is less than its thickness at the intermediate portion because of the lack of containment or other support required at threaded upper portion 12.

Desirably, the barrier layer 22, outer layer 24 and layer 26 have constant thicknesses except for layer 24 at the upper threaded portion. Thickness of barrier layer 22 because it is co-extruded with innermost layer 20 and layer 26 if used, can be altered as well. However, this is generally not required since barrier layer 22 acts only as a substance barrier and not as a means for support and a uniform barrier thickness is sufficient to act as the barrier regardless of the thicknesses of other layers. The thickness of outer layer 24, is determined by an injection mold (shown schematically in FIG. 5) and again, typically is of a uniform thickness over the entire preform 10 except at the upper threaded portion. Outer layer 24 is typically used for structurally altering the preform, such as the thread formation for capping, and subsequently the container (shown in FIG. 9), and also for aesthetics such as to provide color or insignia to the container.

Figures 2, 3:
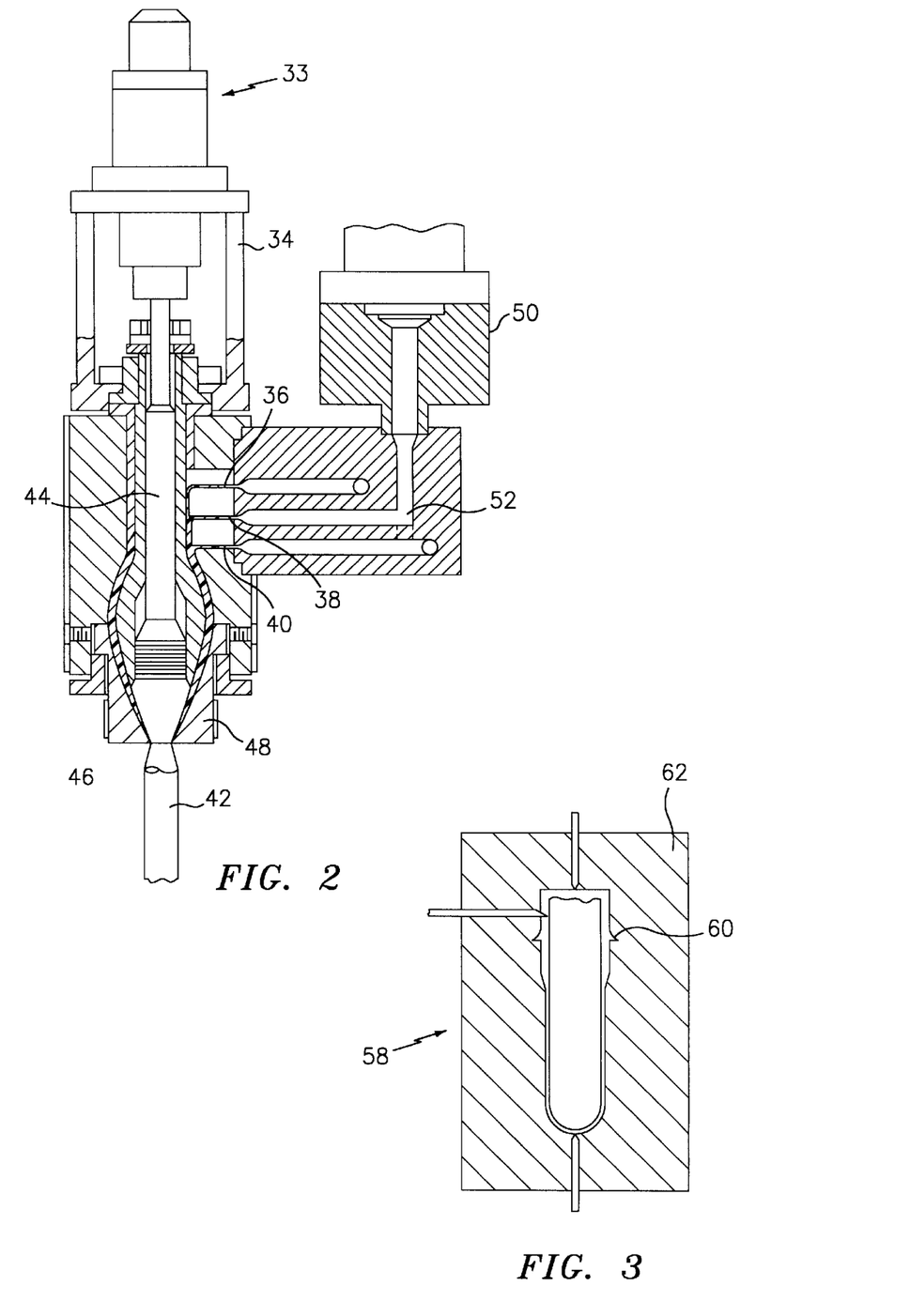
FIGS. 2, 3, 4 and 5 are a simplified representation of the process for forming the preform showing an extrusion step, a blow molding step, a cutting step and an injection molding step in accordance with the principles of the present invention.

With reference to FIGS. 2 and 3, the process for forming preform 10 will be described for the preferred three-layer liner shown in FIG. 8, although this procedure is suitable for forming any preform of the present invention. In forming preform 10A, layers 20, 22 and 26 are extruded via an extruder 33 and extruder head 34. Accordingly, melt streams 36, 38 and 40 are formed into a substantially cylindrically shaped member 42 used for forming the cylindrical wall portion of preform 10A, with stream 36 forming layer 20, stream 38 forming layer 22 and stream 40 forming layer 26. For varying the thickness if desired of the upper, intermediate, and base portions of preform 10A, a melt thickness adjustment device 44 is used with extruder head 34. Adjustment device 44 is preferably in the form of a die pin stem designed for reciprocal motion and positioned in adjacent relationship with the exit area 46 of the melt streams through die bushing 48. By reciprocally moving die pin 44, the thickness of the wall forming the cylindrically shaped member 42, specifically innermost layer 20 (see FIGS. 1 and 8) thereof, can be achieved. However, depending upon the design of extruder head 34, layers 22 and 26 are co-extruded with innermost layer 20 and can have thickness variations along the portions comprising preform 10A.

In accordance with the present invention, the length of the barrier 22 is foreshortened so that the barrier extends from above the closed base 18 to below access opening 13. This is accomplished by valve means 50 which creates a pressure drop in melt channel 52 for melt stream 38 and thereby serves to create a pressure drop in feed channel 52 to interrupt feeding of melt stream 38 where desired. Alternatively, one could accomplish this by valving, or by oscillating a plunger in valve means 50, or by use of a ball valve in feed channel 52.

One desires the barrier, as EVOH, as high as possible in the preform, but not up to the top, and right above the base where the pinch line is situated, but desirably close to the pinch line. This is quite advantageous as some barriers as EVOH do not bond well to PET thus allowing a direct PET-PET bond, and also to save cost in the expensive barrier materials.

The PET layers, as for layers 20 and 26, can be virgin or scrap based on commercial considerations with virgin material preferred for areas in contact with contents, or other materials can be used if desired, as polyesters, generally polycarbonates, polyvinyl chloride, etc.

The preforms of the present invention may be formed in any desired plastic preform and blow molding machine for forming a plurality of preforms and blow molding same. For example, plastic blow molding machines of the wheel type may be readily employed such as disclosed by U.S. Pat. Nos. 3,310,834, 3,764,250, 3,986,807 and 5,240,718. These have previously included a wheel having a frame supported on a base for rotation about a horizontal axis with a plurality of mold stations mounted on the wheel frame about the rotational axis such that a pair of mold supports for respectively mounting a pair of mold portions move parallel to the rotational axis between open and closed positions of the mold. Such machines conventionally include a closing station where the mold supports move the mold portions to a closed position to enclose an extruded hot plastic parison within a mold cavity for blowing to the shape of the mold and for subsequent cooling prior to opening at an opening station at an appropriate revolution of the wheel. By varying the speed of the wheel in relation to the extrudate from the extrusion head, axial orientation can be imparted to the parison. It is advantageous to obtain axial orientation of the parison in order to obtain desired properties from PET and the barrier material for different applications. The amount/rate of stretch can be customized and computer-controlled to suit different applications.

Figure 4:
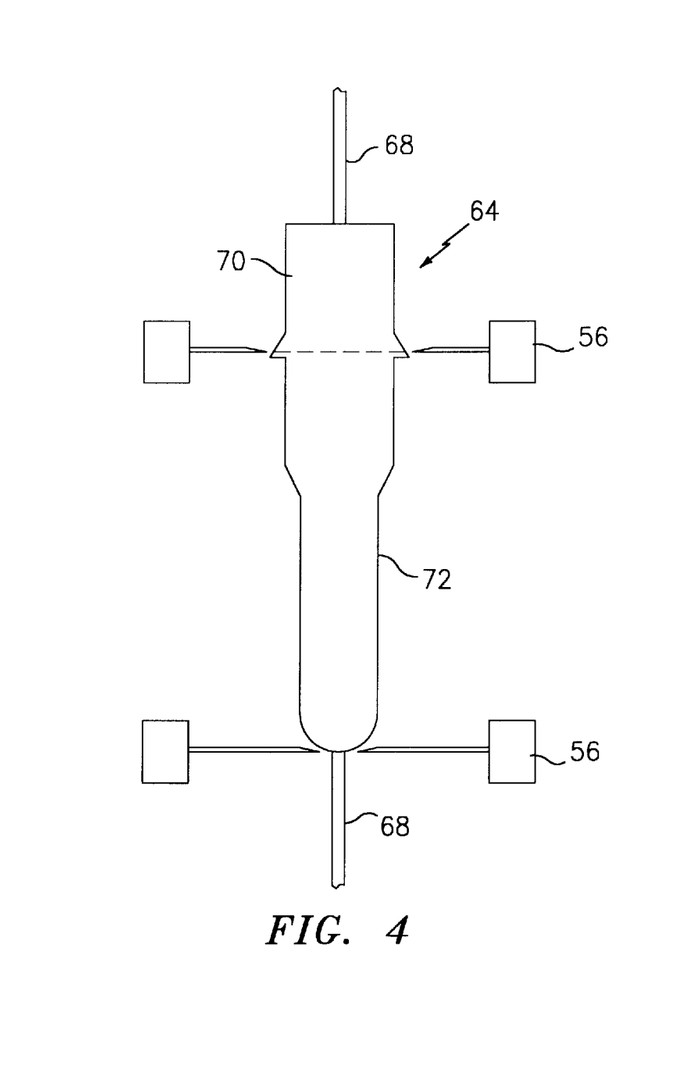

The extrudate, cylindrically shaped member 42 exits extruder head 34 in one continuous length. Accordingly, member 42 must be cut into lengths which are suitable for forming a particular size container. Such cutting is accomplished by a cutting device (not shown) positioned in the course of blow molding after extruder head 34. The trimming may be performed via a cutting device 56, shown in FIG. 4.

Figure 7:
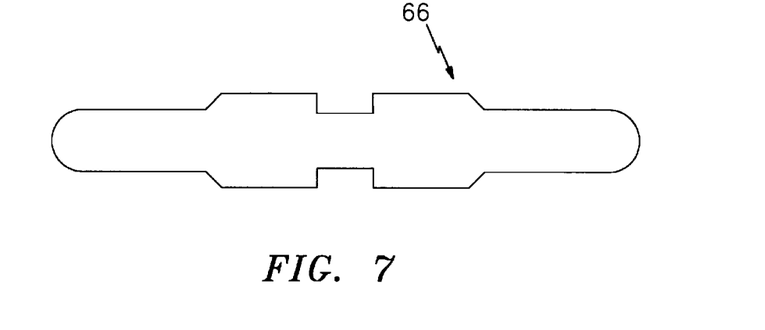
FIG. 7 is a cross-sectional view of a back-to-back extruded and formed preform liner.

As shown in FIG. 2, member 42 is caused to exit the extruder head 34 and is directed into a blow molder 58 where a circumferential ridge 60 may be formed thereon via the shape of blow mold 62. While in blow mold 62, extrudate member 42 is formed via blow molding into molded member 64 shown in FIG. 4. The molded member 64 may also be formed by a blow mold such that a composite member 66 is formed from two liners connected end to end, as shown in FIG. 7, subsequently cut into individual liners having a desired shape. Molded member 64, having the appropriate thicknesses and barrier distribution, is then cooled to the proper temperature and ejected from blow mold 62 of blow molder 58. During the blow molding process, the end of molded member 64 is sealed, a procedure which is simplified by the absence of barrier material in the seal area, resulting in excess plastic 68. In addition, portion 70 extends beyond the would be length of preform liner 72 and is used for assisting the cutting of molded member 64 for forming ridge 60. Cutting device 56 is used to trim excess material 68 and portion 70 from molded member 64 in a subsequent cutting operation for forming preform liner 72, wherein the top material does not contain the expensive barrier material and may be readily recycled.

Figure 5:
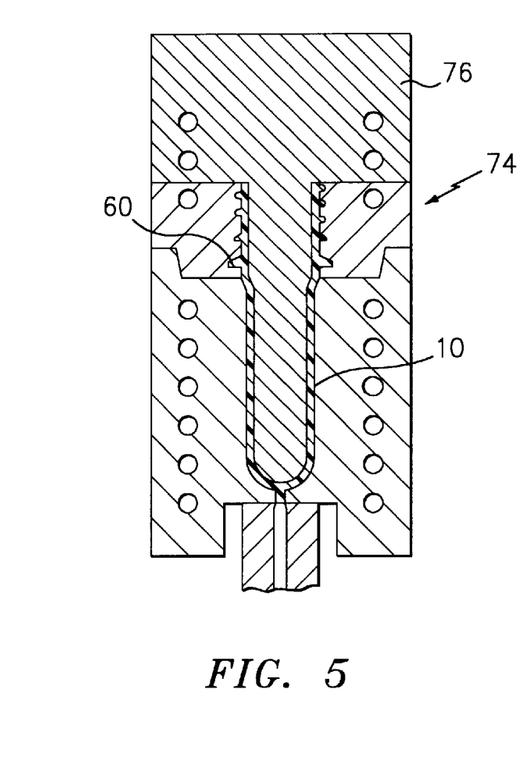
Figure 6:
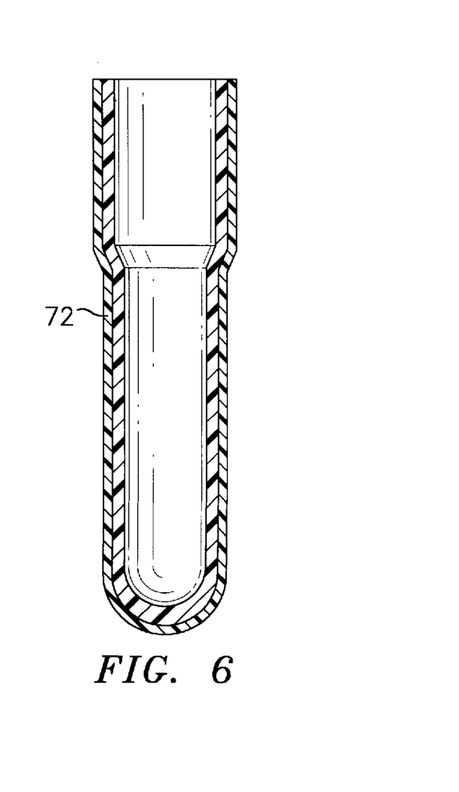
FIG. 6 is an elevational and cross-sectional view of a two layered preform liner after the extrusion, blow molding and cutting process steps are performed as shown in FIG. 2.

After liner 72 is formed into the desired shape, as for example shown in the embodiment of FIG. 6 which shows a two-layer embodiment, via blow molder 58, liner 72 is moved into an injection molder 74, shown in FIG. 5, having an injection mold 76 for forming outer layer 24 (see FIGS. 1 and 8) over liner 72. Accordingly, injection mold 76 is in the shape of preform 10, shown in FIG. 1 or 10A, shown in FIG. 8. Injection molder 74 injects outer layer 24 over liner 72 for finishing the formation of the preform. The melt used to form outer layer 24 is preferably recycled PET and is adapted to be used for forming aesthetic features such as color and surface designs, and functional features such as threads and flanges. However, with the exception of upper threaded portion 12, the thickness of outer layer 24 as formed by injection molder 74 is preferably maintained as a uniform thickness. By maintaining this thickness uniform, the preform can be much more easily removed from injection mold 76.

With reference now to FIG. 9, a container 80 is shown which is formed from preform 10 or 10A (see FIGS. 1 and 8) via a blow molding operation, to be discussed below. Similar to the preform, container 80 includes a threaded upper portion 82, an angled intermediate portion 84, a substantially vertical intermediate portion 86 and a base portion 88, which is shown in the embodiment of FIG. 9 as a footed base. As shown in FIG. 9A, container 80 has four layers of material, having properties and relative thickness relationships differing, however, from the layers of materials described for preform 10 in FIG. 1 or 10A in FIG. 8. Also, outermost layer 90 (which corresponds to outermost preform layer 24) represents the major portion of the container 80. Barrier layer 92 (which corresponds to layer 22 in preform 10A) extends from below access opening 93 to above container bottom 94. Layers 96 and 98 (corresponding respectively to layers 20 and 26 in preform 10A) are bonded together above and below barrier 92 at the upper portion 82 and base portion 88, respectively.

Because innermost layer 96 is not subject to blowing at the neck region, in forming the container shape, the thickness ratios between the various portions of the container differ from those for inner layer 20 of preform 10 or 10A (see FIGS. 1 and 8). Thus, innermost layer 96 may have a thickness at angled and vertical intermediate portions 84 and 86, respectively, which is thinnest with regard to the thicknesses at the other portions. Innermost layer 96 may have a thickness at footed base 88 which is thicker than the thickness at said angled and intermediate portions so as to strengthen this support area of container 80. The thickness of the innermost wall at base portion 88 is typically substantially equal to the thickness at the upper threaded portion 82. However, this relationship may vary depending, at least partly, on the size of the container. In footed base portion 88, if a footed base is used, innermost layer 96 is formed into a plurality of circumferentially positioned feet 100 whose function is to sturdily support container 80 on a flat surface. Feet 100 extend circumferentially around the lower end 102 of container 80. Each foot 100 is defined by an indent on each vertical side thereof, each of which extends from a central area of the bottom of container 80 upwardly on the circumference of container 80 toward top end 93 of container 80. Due to the increased thickness of innermost layer 96 which forms footed base 88, feet 100 are substantially harder and less flexible than intermediate portions 84 and 86.

Referring now the FIG. 9A, in the threaded upper portion 82, corresponding directly with threaded upper portion 12 of preform 10 and 10A (see FIGS. 1 and 8), innermost layer 96 has a thickness which is thicker than thickness of the intermediate portions because it was not subject to blow molding.

The multi-layer design of container 80 is advantageous for present day recycling efforts. Specifically, the layers forming container 80 are easily separable by pulling them apart and thus can be divided appropriately for recycling purposes, especially since the barrier does not extend all the way to the top and bottom of the container. When more than one material is used, and if the layers do not separate, recycling of containers can be difficult because the materials cannot be separated and properly categorized. With the multi-layer design disclosed herein, such a separation and categorization is achievable, while also allowing material thickness control.

In the preferred embodiment, the outer layer makes up the major portion of the thickness of the preform and the container. Desirably, the inner layer makes up from 5–20% of the thickness of the preform and of the container.

Figure 10:
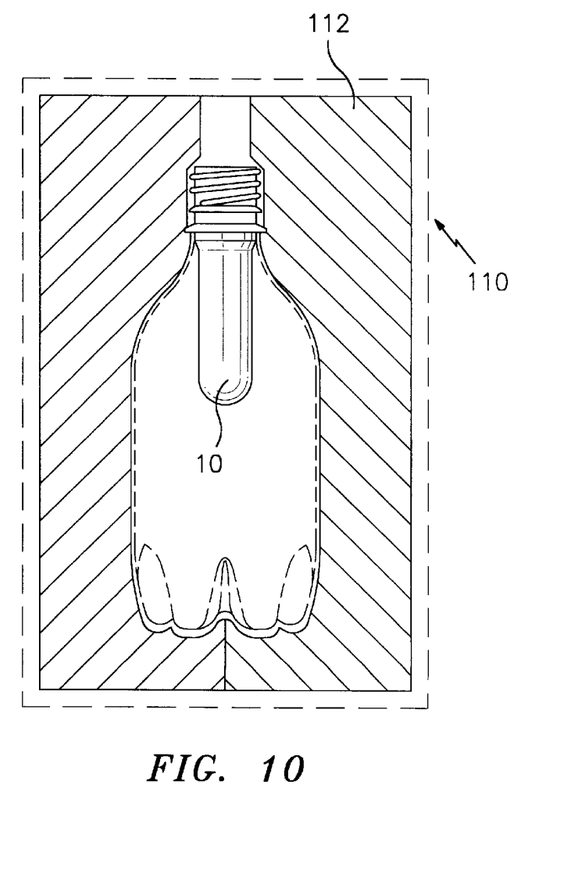
FIG. 10 is an elevational view showing the process of blow molding the preform into the container.

Referring now to FIG. 10, a process for forming container 80 (see FIG. 9) will be described. The process for forming container 80 includes the process described above for forming preform 10 or 10A. In addition, after outer layer 24 is added to liner 72 via injection mold 76, preform 10 or 10A is formed and is subsequently removed from injection mold 76. After removal, preform 10 or 10A is placed into blow mold 110 having mold halves 112, shown in FIG. 10. Before placing preform 10 or 10A into blow mold 110, it may be necessary to heat the preform. If preform 10 or 10A is immediately removed from injection mold 76 and placed into blow mold 110, preform 10 or 10A may be sufficiently heated. Otherwise, preform 10 or 10A should be placed into a heater (not shown) prior to placement into blow mold 110. Referring to FIG. 10, preform 10 or 10A is placed into blow mold 110 and held securely therein via engagement of the mold with threaded upper portion 12. Once proper placement of the preform is established, blow mold 110 is used to blow preform 10 into the shape of container 80 (see FIG. 9), shown by the dotted lines in FIG. 10. During blowing, the preform is secured in the blow mold via the upper portion 12 of the preform which is maintained free from the blow molding applied to the remaining portions of the preform in forming the container. Once preform 10 or 10A is formed into the container, mold halves 112 are opened and the completed container 80, as shown in FIG. 9, is removed.

With reference to the processes described above for the formation of preform 10 or 10A and container 80, these processes can be combined into one process and the process can be automated which would include facilitating a plurality of interconnected stations adapted to perform the steps as described above. Reference is hereby made to U.S. Pat. No. 5,244,610 and No. 5,240,718 disclosing a wheel type plastic blow molding machine combining the steps of preform extrusion and preform blow molding. Each of these patents are assigned to and owned by the Assignee of the present application and the molding device described therein is hereby incorporated herein for use with the instant invention.

A primary advantage of the present invention is that a preform and container, and a process for forming the same, having multiple layers are provided wherein at least one layer may have varied thicknesses for different portions of the preform and container having different functions. Thus, for example, one can obtain programmed thickness at different portions of the preform and at different portions of the resultant container, as providing a container which is thicker in the bottom or base area and in the neck portions. This is advantageous for hot-fill applications, e.g., reduction of deformation on filling. A particular advantage is that the barrier layer does not extend all the way to the top or bottom of the preform or container. Another advantage of this invention is that a preform, and process for forming the same, are provided for forming a container which is highly convenient to recycling. Yet another advantage of this invention is that a preform and container are provided having multiple layers, wherein the inner layer varies in thickness at different portions of the container for accomplishing different functions. Still another advantage of this invention is that a multi-layer preform and container is provided wherein each layer has a specific function such as a barrier layer, a contents contact layer, and a outer aesthetic/functional layer.

In addition, the present container is highly useful as a barrier container for hot fill materials. The extruded liner allows one to readily control the thickness of various parts of the container as desired. Also, the container exhibits excellent oxygen and carbon dioxide resistance. Further, the extrusion-injection-blow molding process enables one to obtain desirable biaxial orientation in the container, and indeed to control the amount of orientation due to the extrusion process. Still further, one can create a lighter container with improved properties over a heavier container and thereby obtain a considerable savings in material costs. Still further, one can use the same shaped preform for different shaped containers and with controllable orientation. Also, the container can be prepared using conventional materials.

It is apparent that there has been provided in accordance with this invention multi-layer containers and preforms which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A multi-layered preform for blow molding a container which comprises: an extruded inner layer forming a cavity and defining an upper portion adapted to be formed into an upper portion of a container and including an access opening therein, an intermediate portion adapted to be formed into an intermediate portion of the container, and a closed base portion adapted to be formed into a base portion of the container; an outer injection molded layer located substantially adjacent the inner layer and coextensive therewith and comprising the major portion of the preform; and wherein the inner layer comprises at least two layers, with the innermost first layer extending over the entire upper portion, the intermediate portion and the base portion, and the intermediate second layer comprising an oxygen barrier layer extending from above the closed base portion to below the access opening, wherein the innermost first layer and the outer injection molded layer both extend above the intermediate barrier layer to the access opening and below the intermediate barrier layer to the closed base portion.

2. A multi-layered preform according to claim 1, wherein the intermediate layer extends substantially only over the intermediate portion.

3. A multi-layered preform according to claim 1, wherein the inner layer is a multi-layered laminate including said second layer as the central layer, and said first layer as the innermost layer, and a third layer as an outer layer, wherein said third layer is coextensive with the first layer and wherein said central, innermost and outer layers are coextruded.

4. A multi-layered preform according to claim 3, wherein the barrier layer is an ethylene vinyl alcohol copolymer.

5. A multi-layered preform according to claim 1, wherein the barrier layer is an ethylene vinyl alcohol copolymer.

6. A multi-layered preform according to claim 1, wherein the inner layer has a thickness which differs from the base portion to the upper portion.

7. A multi-layered preform according to claim 1, wherein the inner layer comprises 5 to 20% of the thickness of the preform.

8. A multi-layered preform according to claim 1, wherein said preform is characterized by having axial orientation.

9. A multi-layered preform according to claim 1, wherein the barrier layer has a substantially constant thickness.

10. A multi-layered preform according to claim 1, wherein the outer layer has a substantially constant thickness.

11. A multi-layered container, which comprises: an extruded inner layer forming a cavity and defining an upper portion including an access opening therein, an intermediate portion and a closed base portion; an outer injection molded layer located substantially adjacent the inner layer and coextensive therewith and comprising the major portion of the container; wherein the inner layer comprises at least two layers, with the innermost first layer extending over the entire upper portion, the intermediate portion and the base portion, and the intermediate second layer comprising an oxygen barrier layer extending from above the closed base portion to below the access opening, wherein the innermost first layer and the outer injection molded layer both extend above the intermediate barrier layer to the access opening and below the intermediate barrier layer to the closed base portion.

12. A container according to claim 11, wherein the intermediate layer extends substantially only over the intermediate portion.

13. A container according to claim 11, wherein the inner layer is a multi-layered laminate including said second layer as the central layer, and said first layer as the innermost layer, and a third layer as an outer layer, wherein said third layer is coextensive with the first layer and wherein said central innermost and outer layers are coextruded.

14. A container according to claim 13, wherein the barrier layer is ethylene vinyl alcohol copolymer.

15. A container according to claim 11, wherein the barrier layer is an ethylene vinyl alcohol copolymer.

16. A container according to claim 11, wherein the inner layer has a thickness which differs from the base portion to the upper portion.

17. A container according to claim 11, wherein the container has a footed base formed from the base portion of the inner layer and the adjacent outer layer.

18. A container according to claim 11, wherein said container is biaxially oriented.

19. A container according to claim 11, wherein the outer layer makes up the major portion of the thickness of the container.

20. A container according to claim 11, wherein the inner layer comprises 5 to 20% of the thickness of the container.

* * * * *